United States Patent [19]

Ehrenfried

[11] Patent Number: 4,547,055

[45] Date of Patent: Oct. 15, 1985

[54] METHOD AND APPARATUS FOR OPTIMIZING OBJECT DISTANCE SIGNALS

[75] Inventor: George Ehrenfried, Cambridge, Mass.

[73] Assignee: Polaroid Corporation, Cambridge, Mass.

[21] Appl. No.: 686,474

[22] Filed: Dec. 26, 1984

[51] Int. Cl.⁴ .......................... G03B 3/00; G01S 15/88
[52] U.S. Cl. ........................................ 354/401; 367/96
[58] Field of Search .................. 354/400–409; 367/96

[56] References Cited

U.S. PATENT DOCUMENTS

| | | | |
|---|---|---|---|
| 4,199,246 | 4/1980 | Muggli | 354/195 |
| 4,280,204 | 7/1981 | Elchinger | 367/116 |
| 4,303,319 | 12/1981 | Hell et al. | 354/403 |
| 4,341,447 | 7/1982 | Biber | 354/408 |
| 4,423,936 | 1/1984 | Johnson | 354/403 |
| 4,470,681 | 9/1984 | Johnson | 354/403 |
| 4,487,494 | 12/1984 | Ishikawa | 354/401 |

Primary Examiner—William B. Perkey
Attorney, Agent, or Firm—John J. Kelleher

[57] ABSTRACT

An improved method and apparatus for optimally focusing an image at a focal plane of a plurality of subjects located at substantially different distances from an image-forming adjustable focus lens system of the type that is responsive to a rangefinder derived signal, where the rangefinder is one that normally generates a subject distance signal representative of the distance to the nearest of a plurality of different distance subjects. Improved focusing is achieved by generating a composite signal representative of the relative size of each of the plurality of subjects and their distance from the rangefinder and then comparing this composite signal with that of the above-mentioned nearest subject distance signal. A signal representative of the degree of deviation of these signals from one another is then employed to optimally focus an image of the plurality of different distance subjects at the lens system focal plane.

6 Claims, 4 Drawing Figures

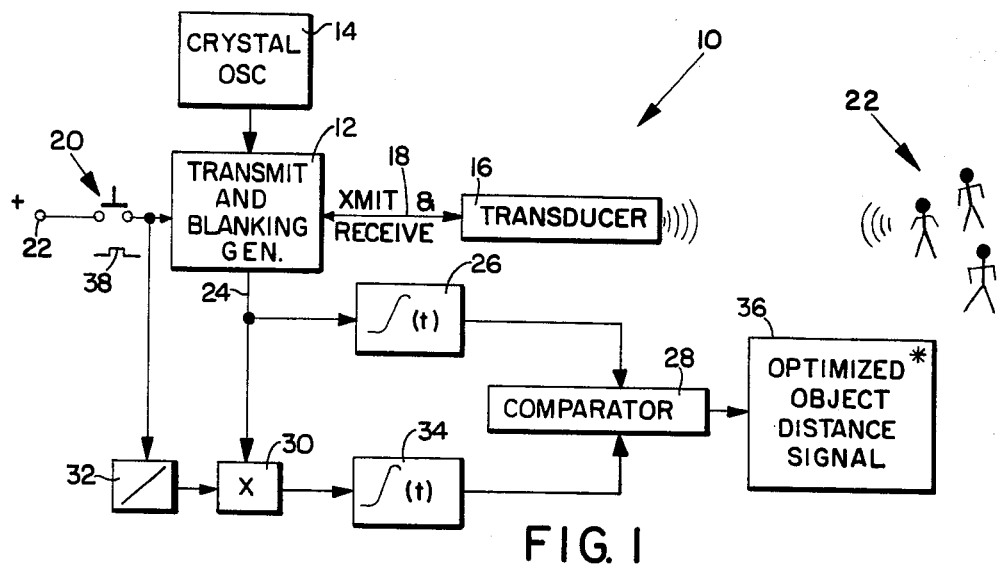
FIG. 1
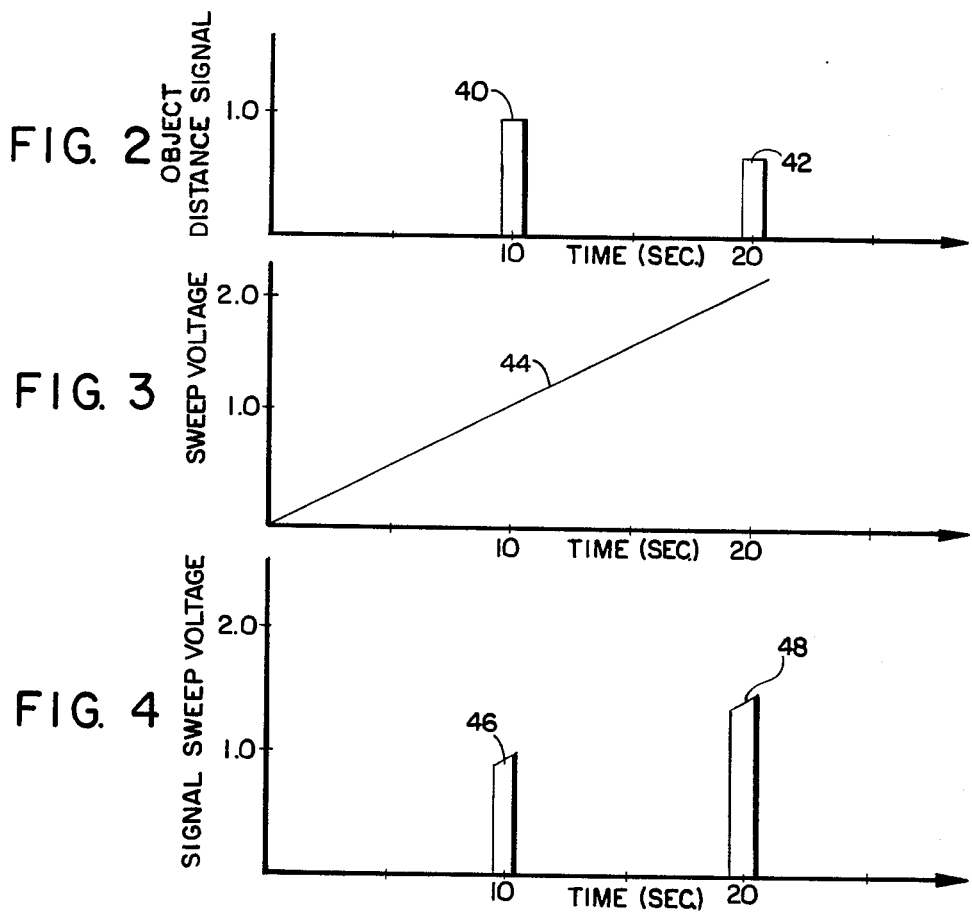
FIG. 2
FIG. 3
FIG. 4

METHOD AND APPARATUS FOR OPTIMIZING OBJECT DISTANCE SIGNALS

BACKGROUND OF THE INVENTION

The present invention relates to apparatus for automatically focusing an adjustable focus lens, in general, and to apparatus for focusing such a lens in response to a rangefinder derived subject distance signal representative of the optimal distance to a plurality of subjects located at substantially different subject distances, in particular.

Adjustable focus lenses and apparatus employing such lenses are well known and their operation well understood in the art. In addition, the automatic focusing of such lenses in response to a rangefinder derived signal representative of the distance to a particular subject is also well-known in the lens focusing art. A photographic camera having an adjustable focus lens and having a focus control system coupled to said lens for automatically focusing image forming light rays of a subject at the film plane of such a camera in response to an ultrasonic rangefinder derived signal representative of the distance between said camera and the subject to be photographed is sold by Polaroid Corporation under its registered trademark SX-70 SONAR. U.S. Pat. No. 4,199,246 to MUGGLI describes a focus control system coupled to an adjustable focus lens that is responsive to a rangefinder derived signal of the type employed in such a self-focusing camera.

It is well-known that every optical lens system including those of the adjustable focus lens type has a particular depth of field associated therewith or a range of subject distances within which images of subjects located within said depth of field will be in focus at the lens system's focal plane. It is also well-known that the depth of field of an adjustable focus lens is less when the lens is focused on near subjects than it is when focused on those that are more distant, therefore, lens focusing accuracy is significantly more critical when attempting to focus an image of a subject in relatively close proximity to an image forming adjustable focus lens.

In ultrasonic rangefinders of the type employed in the above-mentioned SX-70 SONAR camera, subject distance is determined by determining the distance to the nearest of a group of subjects to be photographed and then causing the camera's lens to sharply focus an image of said nearest subject. Subject distance is primarily determined by determining the round-trip transit time for a burst of ultrasonic energy to reach a particular subject and then be reflected back and subsequently detected by said ultrasonic rangefinder. Subjects located behind or at a greater distance from the rangefinder and beyond the lens' depth of field will be out of sharp focus to a degree dependent upon their particular distance behind said nearest subject. Rangefinders of this type do not have the ability to determine the distance to more remote subjects for lens focusing purposes once a particular nearest subject distance has been determined, even if the number and size of more remote subjects are quite large. As a consequence, and as explained above, these particular more remote subjects will not be in proper focus when there is a narrow depth of field associated with a lens system. This is normally true when the nearest subject is quite close to the rangefinder or lens system.

A primary object of the present invention, therefore, is to provide apparatus for optimizing the image formed by an adjustable focus lens of a plurality of subjects located at substantially different subject distances.

Another object of the present invention is to provide a method and apparatus for automatically focusing the image of a plurality of subjects located at substantially different subject distances by means of an adjustable focus lens system reponsive to a sonic rangefinder derived subject distance signal.

A further object of the present invention is to provide a method and apparatus for minimizing the extent of misfocus of the image of a plurality of subjects located at substantially different subject distances from an adjustable focus lens responsive to a sonic rangefinder derived signal where the rangefinder is of the type that generates a subject distance signal representative of the distance to the nearest of a plurality of such subjects.

Other objects, features, and advantages of the present invention will be readily apparent from the following description of the preferred embodiment thereof taken in conjunction with the accompanying drawings.

SUMMARY OF THE INVENTION

In accordance with the present invention, a method and apparatus are provided for optimally focusing an image of a plurality of subjects located at substantially different distances from an image-forming adjustable focus lens system responsive to a rangefinder derived subject distance signal. Optimal focusing is achieved by generating a composite signal representative of the relative size of each of said subjects and their distance from the rangefinder and then comparing this composite signal with that of another signal representative of the distance to the nearest subject of said plurality of different distance subjects. A signal representative of the degree of deviation of these signals from one another is then employed to optimally focus the image of each of said plurality of different distance subjects.

BRIEF DESCRIPTION OF THE DRAWINGS

FIG. 1 is a signal flow block diagram of an ultrasonic rangefinder incorporating a preferred embodiment of the object-distance-signal optimizing technique of the present invention.

FIG. 2 is a graph of a voltage signal representative of the distance to a plurality of different distance subjects as a function of time.

FIG. 3 is a graph of a voltage ramp that linearly increases over the same time interval as that shown in drawing FIG. 2.

FIG. 4 is a graph of the product of the different distance subject distance signals of drawing FIG. 2 and the linearly increasing voltage or ramp shown in drawing FIG. 3.

DESCRIPTION OF THE PREFERRED EMBODIMENTS

Referring now to the drawings, in FIG. 1 a signal flow block diagram of ultrasonic rangefinder 10 incorporating a preferred embodiment of the object distance signal optimizing technique of the present invention, is depicted. In FIG. 1, rangefinder 10 includes transmit and and blanking generator 12 to which the output of high frequency crystal oscillator 14 is applied. Transmit and blanking generator 12 couples the output of crystal oscillator 14 to capacitance-type ultrasonic transducer 16 through path 18 for a predetermined length of time after manually actuated switch 20 couples a source of voltage connected to terminal 20 (not shown) to the rangefinding sequence initiating input of said transmit and blanking generator 12.

When energized through transmit and blanking generator 12, capacitance-type ultrasonic transducer 16 transmits and subsequently receives a reflection or echo of a burst of ultrasonic energy having a highly directional multiple lobe pattern whose contours are fairly well understood in the art. The intensity of the ultrasonic energy reflected from a subject obeys an inverse square law and therefore the intensity of the received ultrasonic energy reflected from said subject is primarily dependent upon subject distance and size. The multiple lobe pattern of a capacitance-type ultrasonic transducer having a circular backplate of 3.5 cm in diameter, for example, consists of a central lobe having a lobe angle of approximately 12° at its half power point ($-3$ dB) when operated at a frequency of 50 KHz, with the central lobe being generally symmetrical about its central lobe axis and a plurality of smaller side lobes being symetrically oriented about said central lobe axis. This ultrasonic, multiple lobe pattern is described in much greater detail in an article by W. Kuhl, et al entitled "Condenser Transmitters and Microphones with Solid Dielectric Airborne Ultrasonics" in Acustica, Vol. 4, 1954, pp. 519–532. An echo of said burst of transmitted ultrasonic energy reflected from subjects 22, for exammple, and detected by transducer 16 is, in turn, routed to transmit and blanking generator 12 through path 18 either in the form of a single pulse or a series of electrical pulses depending upon the number of subjects detected.

While a burst of ultrasonic energy is being generated by transducer 16 and transmitted toward a subject such as subjects 22 in drawing FIG. 1 in response to a transmit signal from transmit and blanking generator 12, output path 24 is blanked or clamped at a fixed potential in order to prevent the simultaneous generation of a false object detection signal. Both the transmit signal to and the receive signal from transducer 16 employ path 18 for signal transmission purposes. Therefore, by preventing the output of transmit and blanking generator 12 from appearing on path 24 during the time that a transmit signal is being applied to transducer 16, spurious object detection signals that would otherwise appear on said path 24 whenever a transmit signal is generated by transmit and blanking generator 12, are precluded.

Object detection signals from transducer 16 by way of transmit and blanking generator 12 appearing on path 24 are applied to the input of integrator 26. Object detection signals that are so applied are integrated and then applied to signal comparator 28. Object detection signals from transducer 16 and transmit and blanking generator 12 are also applied to an input of signal multiplier 30. An output from linearly increasing voltage or ramp generator 32 is also applied to the input of signal multiplier 30. The product of the voltage from ramp 32 and the signal voltage from transmit and blanking generator 12 is applied to the input of integrator 34. The output of integrator 34 is applied to signal comparator 28 where its magnitude is compared with that of the output from signal integrator 26. The compared inputs of integrators 26 and 34 are then employed to produce optimized object distance signal 36.

Optimized object distance signal 36 is preferably employed in an adjustable focus lens camera not shown) for automatic lens focusing purposes. Lens focusing apparatus in such a camera adjusts the lens to the desired focus position in response to object distance signal 36 of rangefinder 10. An object distance determining sequence is accomplished for such focusing purposes in the following manner. With reference to FIGS. 1–4 of the drawings, manually actuated switch 20 of ultrasonic rangefinder 10 is momentarily depressed to thereby generate sequence initiating pulse 38 at its output and at the input to transmit and blanking generator 12 and voltage ramp generator 32. Upon receipt of pulse 38 at its input, transmit and blanking generator 12 momentarily couple the output of time base providing crystal oscillator 14 to ultrasonic transducer 16 thereby causing transducer 16 to transmit a burst of ultrasonic energy toward subject 22, with each of said subjects being located at substantially different distances from rangefinder 10.

Echoes of the burst of ultrasonic energy reflected from subjects 22 are subsequently detected by said transducer 16 thereby causing transducer 16 to generate a plurality of time-dependent object detection signals representative of the distance to each detected subject and their relative size. These object distance signals are then routed to the inputs of integrator 26 and signal multiplier 30 through transmit and blanking generator 12, path 18, and then path 24. Two such object distance signals in the form of pulses 40 and 42 are shown in the graph of object distance as a function of time illustrated in drawing FIG. 2. Object distance signal 42 is smaller in magnitude than object distance signal 40 primarily because the object corresponding to said signal 42 is more remote from rangefinder 10 than the object corresponding to said signal 40. Object distance signals 40 and 42, for example, appearing at the input to integrator 26 are integrated by said integrator 26 and then applied to an input channel of signal comparator 28.

As noted above, pulse 38 generated by the manual actuation of switch 20 is also applied to the input of voltage ramp generator 32. Upon receipt of pulse 28, a linearly increasing voltage 44 is subsequently generated by said ramp generator 32. Linearly increasing voltage 44 is applied to multiplier 30 where it is multiplied by object distance pulses 40 and 42 routed through transmit and blanking generator 12 and appearing on path 24. The function of ramp generator 32 is to, in effect, amplify object detection signals appearing on path 24 before they are applied to voltage integrating, capacitance-type integrator 34 so that at least a portion of each of said signals will be of sufficient magnitude to be integrated by said integrator 34. The product of object distance signals 40 and 42 and ramp voltage 44 form product pulses 46 and 48, respectively, as shown in drawing FIG. 4. Product pulses 46 and 48 are applied to and integrated by integrator 34 and then applied to another input channel of signal comparator 28. The outputs of integrators 26 and 34 are then compared by comparator 28 with the resultant comparison or ratio signal from said comparator 28 forming optimized object distance signal 36. Optimized object distance signal 36 is, in effect, a subject distance signal that more accurately approximates the distance to all of the different subjects within a group of subjects 22 than would be represented by a subject distance representative of the distance to the nearest single subject within said group of subjects 22.

DISCUSSION

The first pulse-signal appearing on path 24 at the output of transmit and blanking generator 12 and at the input to and at the output of integrator 26 generated by transducer 16 is a signal that is representative of the distance to the nearest subject within the group of subjects 22. This type of subject distance signal is of the type employed in the SX-70 SONAR camera mentioned above. The magnitude and/or width of this signal is dependent upon subject size and distance. This first-pulse subject distance signal is integrated by integrator 26 and is then applied to an input channel of comparator 28 for signal comparison purposes as previously explained. When the integrated voltage output level of integrator 26 reaches a predetermined magnitude it, in effect, constitutes a signal representative of the distance to the nearest object. Subsequent subject distance signals resulting from the detection of one or more of the other more remote subjects within group of subjects 22 applied to the input of integrator 26 do not produce any change in this nearest subject distance signal. This nearest subject distance signal will become less and less representative of the distance to all of the subjects within group of subjects 22 as the distance between the nearest subject and the remaining subjects within the said group of subjects 22 increases.

Rangefinder 10 of the present invention minimizes the subject distance signal error of group of subjects 22 by comparing the nearest subject distance signal generated by integrator 26 with a plurality of signals representative of all of the subjects within group of subjects 22 in comparator 28 and then generates an optimum subject distance signal more representative of the distance to all of the group of subjects 22 than the nearest subject distance signal generated by integrator 26. This optimum subject distance signal is generated in the following manner.

As explained above, a pulse generated by the manual actuation of switch 20 causes the generation of a voltage ramp 44 by signal amplifying ramp generator 32 that is subsequently multiplied by object detection signals appearing at the input to integrator 36 on path 24, by signal multiplier 30. This product is then integrated by integrator 34 and subsequently compared to the nearest subject distance signal from integrator 26 by comparator 28 to thereby produce optimized object distance signal 50. The object detection signals that are integrated by integrators 26 and 34 vary in amplitude and/or width in accordance with the intensity of the reflected signals. Signal intensity is, in turn, dependent upon subject size and distance. Signal intensity, therefore, is directly related to the areas under the curce shown, for example, in drawing FIG. 2 and referred to herein as object detection signals 40 and 42.

Rangefinder 10 is designed such that the product of ramp 44 and the nearest subject distance signal applied to the input of integrator 26 produces a signal that is substantially the same as the nearest subject distance signal without such multiplication. Therefore, if group of subjects 22 consisted of only a single subject, optimized object distance signal 36 would be the same as the nearest subject distance signal from integrator 26. However, as the number of more remotely spaced subjects within groups of subjects 22 increases, the magnitude of the signals representative of these more remote subjects increases as they are multiplied by increasingly larger values of ramp voltage 44 even though the magnitude of signals appearing on path 24 resulting from more distant subjects decreases. These increased magnitude subject distance signals will subsequently cause the output of integrator 34 to increase in magnitude by such multiplication thereby reflecting the presence of subjects more remote than the nearest subject and thereby enabling comparator 28 to generate optimized subject distance signal 36, a signal that is dependent upon the different distances of the subjects within group of subjects 22 from rangefinder 10 and their relative sizes. It should be noted that because the magnitude of the optimized subject distance signal is dependent upon subject distance and size and the reflection or echo from a detected subject obeys an inverse square law, the relationship between subject distances of subjects located within a group of such subjects is nonlinear. If, for example, two identical size subjects are located at different distances from the rangefinder with the more remote subject being say ten feet further away than the nearer subject, the optimized subject distance signal would not be halfway between said two subjects. In such a situation, the optimized subject distance would be closer to the nearer subject than to the more remote one. Similarly, if a group of subjects were clustered betwen a near and a remote subject, the optimum subject distance would be closer to said clustered group than to either sad near or remote subjects. If said clustered group was large enough, the optimum subject distance signal would be primarily determined by said clustered group of subjects. An important advantage flowing from this relationship is that in, for example, an adjustable focus lens camera employing rangefinder 10 for automatic lens focusing purposes, the depth of field will be larger when the subject distance signal has been employed to focus the lens system at a point that is more representative of the distance to a group of different distance subjects than the distance to the nearest subject which will minimize any misfocusing that might otherwise occur of subjects located within a group of different distance subjects. This advantage becomes more important when the nearest subject is relatively close to the camera and the remaining subjects are much further away where the adjustable focus lens is in a relatively narrow depth of field condition.

It will be apparent to those skilled in the art from the foregoing description of my invention that various improvements and modifications can be made in it without departing from its true scope. The embodiments described herein are merely illustrative and should not be viewed as the only embodiments that might encompas my invention.

What is claimed is:

1. Apparatus for focusing an optimized image of a plurality of different subjects located at substantially different subject distances, comprising:
    means for deriving a signal representative of the distance to the nearest subject included within said plurality of different distance subjects;
    means for deriving a composite signal representative of the relative size of each of said subjects and their respective subject distances;
    means for generating a signal representative of the ratio between said nearest and said composite subject distance signals;
    an image plane; and
    an adjustable focus lens system responsive to said ratio signal for focusing an optimized image of said plurality of different subjects at said image plane.

2. The apparatus of claim 1, wherein said ratio signal is derived by dividing said composite subject distance signal by said nearest subject distance signal.

3. The apparatus of claim 1, wherein said focusing apparatus generates a signal representative of the distance to a plurality of subjects located at different subject distances and said composite signal is generated by integrating all of said subject distance signals after they have been multiplied by a linearly increasing voltage.

4. Method of focusing an optimized image of a plurality of different subjects located at substantially different subject distances at an image plane, comprising the steps of:

deriving a signal representative of the distance to the nearest subject included within said plurality of different subjects;

deriving a composite signal representative of the relative size of each of said subjects and their respective subject distances;

generating a signal representative of the ratio between said nearest and said composite subject distance signals; and forming an optimized image at said image plane with an adjustable focus lens system responsive to said ratio signal.

5. The method of claim 4, wherein said ratio signal is derived by dividing said composite subject distance signal by said nearest subject distance signal.

6. The method of claim 4, wherein said composite signal is generated by generating a signal representative of the distance to a plurality of subjects located at different subject distances and then integrating said subject distance signals after they have been multiplied by a linearly increasing voltage.

* * * * *